United States Patent
Stuart et al.

[19]

[11] Patent Number: 5,822,680
[45] Date of Patent: Oct. 13, 1998

[54] FREQUENCY SHARING FOR SATELLITE COMMUNICATION SYSTEM

[75] Inventors: James R. Stuart, Louisville, Colo.; Mark Alan Sturza, Woodland Hills, Calif.; David P. Patterson, Bellevue, Wash.

[73] Assignee: Teledesic LLC, Kirkland, Wash.

[21] Appl. No.: 744,337

[22] Filed: Nov. 7, 1996

[51] Int. Cl.$^6$ .................................................. H04B 7/185
[52] U.S. Cl. ........................ 455/12.1; 455/447; 455/427; 455/63
[58] Field of Search ..................................... 455/3.2, 12.1, 455/13.1, 13.2, 13.3, 63, 278.1, 296, 427, 429, 430, 431, 447, 562; 342/75, 352, 356, 359; 370/316, 317

[56] References Cited

U.S. PATENT DOCUMENTS

| | | | |
|---|---|---|---|
| 3,497,807 | 2/1970 | Newton | 455/13.1 |
| 4,004,098 | 1/1977 | Shimasaki | 455/13.1 |
| 4,689,625 | 8/1987 | Barmat | 342/356 |
| 4,819,227 | 4/1989 | Rosen | 455/13.1 |
| 5,077,561 | 12/1991 | Gorton et al. | 342/359 |
| 5,227,802 | 7/1993 | Pullman et al. | 342/352 |
| 5,268,694 | 12/1993 | Jan et al. | 455/427 |
| 5,326,054 | 7/1994 | Turner | 342/352 |
| 5,367,304 | 11/1994 | Jan et al. | 455/427 |
| 5,444,449 | 8/1995 | Poskett et al. | 342/354 |
| 5,473,601 | 12/1995 | Rosen et al. | 455/12.1 |
| 5,574,969 | 11/1996 | Olds et al. | 455/447 |
| 5,582,367 | 12/1996 | Castiel et al. | 455/13.1 |
| 5,584,046 | 12/1996 | Martinez et al. | 455/13.1 |
| 5,621,415 | 4/1997 | Tuck | 455/13.1 |
| 5,641,134 | 6/1997 | Vatt | 455/12.1 |
| 5,668,556 | 9/1997 | Rouffet et al. | 455/12.1 |
| 5,678,175 | 10/1997 | Stuart et al. | 455/13.1 |
| 5,739,788 | 4/1998 | Dybdal et al. | 455/278.1 |

Primary Examiner—Nguyen Vo
Assistant Examiner—Makoto Aoki
Attorney, Agent, or Firm—Christensen, O'Connor, Johnson & Kindness PLLC

[57] ABSTRACT

A communication system and methods for sharing a common communication frequency, without interfering with a second communication system which has a plurality of satellites operating in geostationary orbits (GO) and ground stations (GS) which communicate with the satellites (GEO) on the common communication frequency, is disclosed. Conventional geostationary satellites broadcast in C and $K_u$ bands. Ground stations (GS) which receive these signals must have their antennas pointed toward the plane of the Equator (EQ). Satellites (10) which occupy inclined orbits (LO) and communicate with terrestrial terminals (12) propagate beams of energy that do not intersect the plane of the Earth's Equator. Terrestrial terminals (12) in the northern hemisphere communicate with a satellite (10) only when the sub-satellite point of the satellite (10) is at a latitude more northerly than the terrestrial terminal (12). Terrestrial terminals (12) in the southern hemisphere communicate with a satellite (10) only when the sub-satellite point of the satellite (10) is at a latitude more southerly than the terrestrial terminal (12). The spatial isolation of signals achieved by this novel pointing method insures that both the geostationary and inclined orbit satellite systems do not interfere with each other.

20 Claims, 13 Drawing Sheets

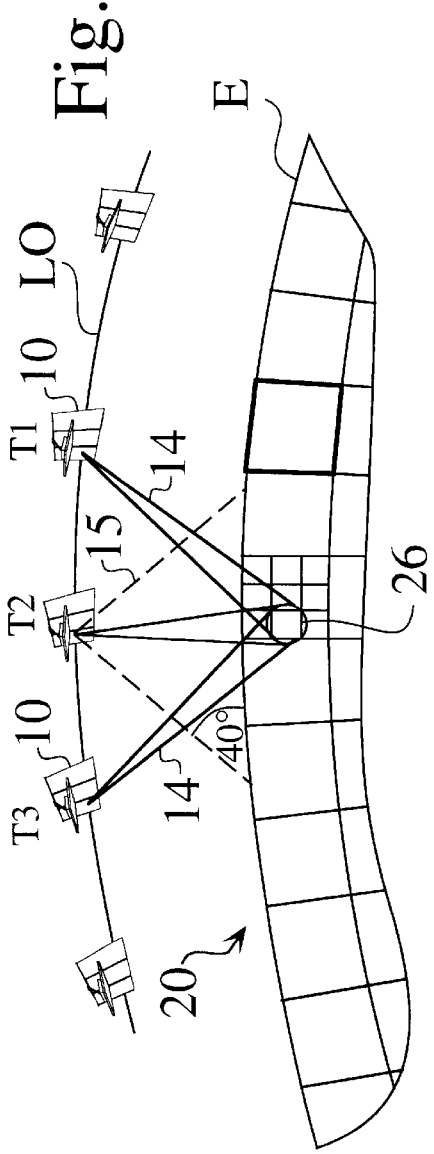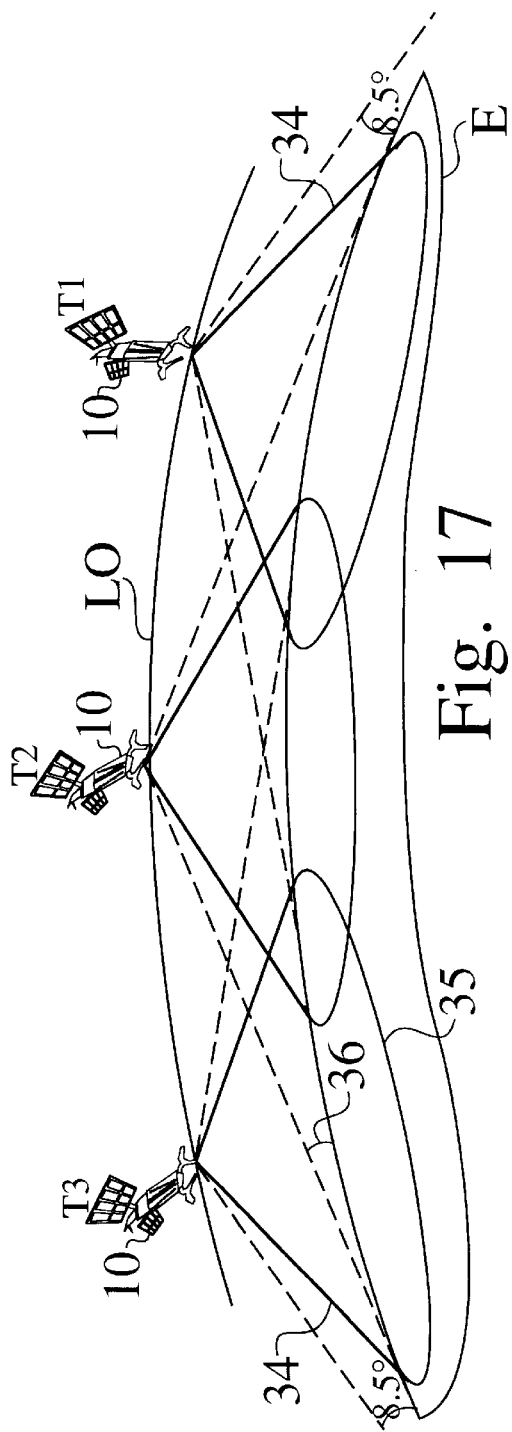

FREQUENCY SHARING FOR SATELLITE COMMUNICATION SYSTEM

CROSS-REFERENCES TO RELATED PATENT APPLICATIONS

The present Patent Application is related to the following commonly-owned U.S. Patents:

U.S. Pat. No. 5,386,953, entitled *Spacecraft Designs for Satellite Communications System*, granted on 7 Feb. 1995 to James R. Stuart;

U.S. Pat. No. 5,408,237, entitled *Earth-Fixed Cell Beam Management for Satellite Communication System*, granted on 18 Apr. 1995 to David P. Patterson and Mark A. Sturza;

U.S. Pat. No. 5,527,001, entitled *Modular Communication Satellite* granted on 18 Jun. 1996 to James R. Stuart; and U.S. Pat. No. 5,548,294, entitled *Dielectric Lens Focused Scanning Beam Antenna for Satellite Communication System*, granted on 20 Aug. 1996 to Mark A. Sturza.

The present Patent Application is related to the following pending, commonly-owned U.S. Patent Applications:

*Satellite Communication System* by Edward F. Tuck et al., filed on 28 Feb. 1994 and assigned U.S. Ser. No. 08/203,140, and claiming the benefit of priority of a Parent Application entitled *Satellite Communication System* by Edward F. Tuck et al., filed on 28 Oct. 1991, and assigned U.S. Ser. No. 07/783,754;

*Terrestrial Antennas for Satellite Communication System*, by Asu Ram Jha, filed on 2 Dec. 1993 and assigned U.S. Ser. No. 08/984,609, and claiming the benefit of priority of a parent Application entitled *Terrestrial Antennas for Satellite Communication System* by Asu Ram Jha, filed on 8 Nov. 1991 and assigned U.S. Ser. No. 07/790,273;

*Non-Blocking Dynamic Fast Packet Switch for Satellite Communication System* by David P. Patterson and Moshe L. Liron, filed on 12 May 1994 and assigned U.S. Ser. No. 08/241,984, and claiming the benefit of priority of a Parent Application entitled *Switching Methods for Satellite Communication System* by David P. Patterson and Moshe L. Liron, filed on 8 Nov. 1991 and assigned U.S. Ser. No. 07/790,805;

*Earth-Fixed Cell Beam Management for Satellite Communication System Using Dielectric Lens-Focused Scanning Beam Antennas* by David P. Patterson and Mark A. Sturza, filed on July 1993 and assigned U.S. Ser. No. 08/088,714, and claiming the benefit of priority of a Parent Application entitled *Beam Compensation Method for Satellite Communication System* by David P. Patterson and Mark A. Sturza, filed on 8 Nov. 1991 and assigned U.S. Ser. No. 07/790,318;

*Spacecraft Antennas & Beam Steering Methods for Satellite Communication System* by Douglas G. Lockie et al., filed on 11 May 1994 and assigned U.S. Ser. No. 08/241,103, and claiming the benefit of priority of a parent Application entitled *Spacecraft Antennas & Beam Steering Methods for Satellite Communication System* by Douglas G. Lockie, filed on 28 Oct. 1992 and assigned U.S. Ser. No. 07/967,988 and claiming the benefit of priority of a parent Application entitled *Spacecraft Antennas & Beam Steering Methods for Satellite Communication System* by Douglas G. Lockie, filed on 8 Nov. 1991 and assigned U.S. Ser. No. 07/790,271;

*Inflatable Torus & Collapsible Hinged Disc Spacecraft Designs for Satellite Communication System* by James R. Stuart et al., filed on 5 May 1994 and assigned U.S. Ser. No. 08/238,568, and claiming the benefit of priority of a Parent Application entitled *Spacecraft Designs for Satellite Communication System* by James R. Stuart, filed on 18 Aug. 1992 and assigned U.S. Ser. No. 07/931,625, which claims the benefit of priority of U.S. Pat. No. 5,386,953;

*Traffic Routing for Satellite Communication System* by Moshe L. Liron, filed on 7 Jun. 1995 and assigned U.S. Ser. No. 08/481,573, and claiming the benefit of priority of a parent Application entitled *Traffic Routing for Satellite Communication System* by Moshe L. Liron, filed on 9 Feb. 1993 and assigned U.S. application Ser. No. 08/016,204;

*Linear Cell Satellite System* by Edward F. Tuck, filed on 15 Nov. 1994, and assigned U.S. Ser. No. 08/340,004; and

*Dielectric Lens Focused Scanning Beam Antenna for Satellite Communication System* by Mark A. Sturza, filed 17 Aug. 1994 and assigned U.S. application Ser. No. 08/292,148.

FIELD OF THE INVENTION

The present invention relates to the field of telecommunications. More particularly, the preferred embodiment of the present invention provides apparatus and methods for sharing frequencies among satellite communication systems that operate in inclined orbits and in conventional geostationary broadcast systems.

BACKGROUND OF THE INVENTION

A large share of television programming produced in the United States is conveyed to broadcasters and viewers via satellite. The particular satellites which relay these television signals orbit the Earth at an altitude of approximately 22,300 miles above the Equator. These satellites are called "geostationary". They are members of a family of "geosynchronous" satellites which complete a single trip around the Earth in the same 24-hour period as the Earth's rotation. Geostationary satellites are in an orbit above the Equator, and therefore appear to remain perpetually fixed over a single point on the Earth's surface.

Geostationary satellites are especially useful for supplying a signal over a very large geographic area. Many of these spacecraft, like the Telstar™ and Galaxy™ satellites, transmit television programs to viewers across all of the continental United States. A single satellite in geostationary orbit is capable of transmitting a signal to nearly forty percent of the Earth's surface.

FIG. 1 shows three geostationary satellites GEO in relatively high orbit directly above the Equator. Geostationary satellites always operate in Equatorial orbits, i.e., orbits that lie in the plane of the Equator. Equatorial orbits are also referred to as "noninclined" orbits, since the angle of inclination between the Equatorial orbit and the plane of the Equator is zero. Each satellite illuminates a large, generally circular area called a footprint FP with a signal. FIG. 2 shows a single geostationary satellite GEO over the Equator. In this diagram, two ground stations GS which are designed to communicate with geostationary satellites are shown within the satellite footprint FP. The ground stations GS must point their antennas back toward the plane of the Equator to communicate with the geostationary satellite GEO.

Both the geostationary satellites GEO and the ground stations GS that communicate with them utilize specific radio frequency bands as prescribed by federal law. In the United States, geostationary satellites are employed to beam television signals to ground stations using the "C" and "$K_u$" frequency bands. These bands generally span the 4 to 8 and 12 to 18 GHz regions of the spectrum, respectively.

Even though enormous quantities of information may be transmitted using these relatively high frequencies, it would be extremely useful if this vast bandwidth could be shared with other communication systems.

Over the past few years, several satellite communication systems have been proposed. These systems are generally designed to enhance existing terrestrial cellular networks. Two of these proposed networks, called Iridium™ and Odyssey™, are described in European Patent Application No. 8911 8458.2 and in U.S. Pat. No. 5,415,368, respectively.

Neither of these two networks provide a solution to the problem of the limitations of existing spectrum by providing a technique for sharing frequencies among systems. The development of a method that would enable a variety of satellite networks to share frequency allocations would constitute a major technological advance and would satisfy a long felt need within the communications and satellite industries.

SUMMARY OF THE INVENTION

The preferred embodiment of the present invention pertains to methods and apparatus for sharing frequencies among different satellite systems. Conventional geostationary satellites broadcast radio and television signals over the C and $K_u$ bands from positions directly above the Earth's Equator. These geostationary satellites operate in Equatorial, or noninclined, orbits. Ground stations which receive these signals must have their antennas pointed toward the plane of the Earth's Equator. The present invention utilizes satellites which occupy inclined orbits, i.e., orbits that are not Equatorial orbits. Because the present invention uses satellites that are in inclined, not in Equatorial orbits, they are not geostationary, although they may be geosynchronous, that is, it may take exactly one Earth day for a satellite to circle the planet. Other types of orbits may be employed by the satellites used in the present invention. These range from circular, low Earth orbits (LEO) to highly eccentric orbits such as the "Molniya" orbit, named after a class of Russian communication satellites. Molniya orbits may have an apogee which is much higher than the altitude of a geosynchronous orbit.

The satellites employed by the present invention communicate with terrestrial terminals which transmit and receive beams of energy that are pointed away from and therefore do not intersect the plane of the Earth's Equator. The spatial isolation of signals achieved by this novel pointing method insures that both the geostationary and inclined orbit satellite systems do not interfere with each other.

An alternative embodiment of the present invention takes advantage of the Earth-fixed cell beam management method. The satellite beams illuminate cells that are within the beam footprints. The beams are continually adjusted to compensate the effects of satellite motion, attitude changes, rotation of the Earth and misalignment of the satellite track with an Earth-fixed grid.

An appreciation of other aims and objectives of the present invention and a more complete and comprehensive understanding of this invention may be achieved by studying the following description of a preferred embodiment and by referring to the accompanying drawings.

BRIEF DESCRIPTION OF THE DRAWINGS

FIG. 2 exhibits ground stations with antennas pointed up toward the plane of the Equator to communicate with conventional satellites in geostationary orbit.

FIG. 16 is a schematic diagram that portrays a single satellite flying over a single Earth-fixed cell in three sequential positions. FIG. 15 also depicts the method of steering a beam of one frequency to continuously illuminate the cell during the times T1, T2 and T3.

FIG. 17 is an illustration of a satellite communication system that uses satellite-fixed cells and a low mask angle of 8.5 degrees.

DETAILED DESCRIPTION OF PREFERRED & ALTERNATIVE EMBODIMENTS

Conventional Geostationary Satellites

Figure 1:
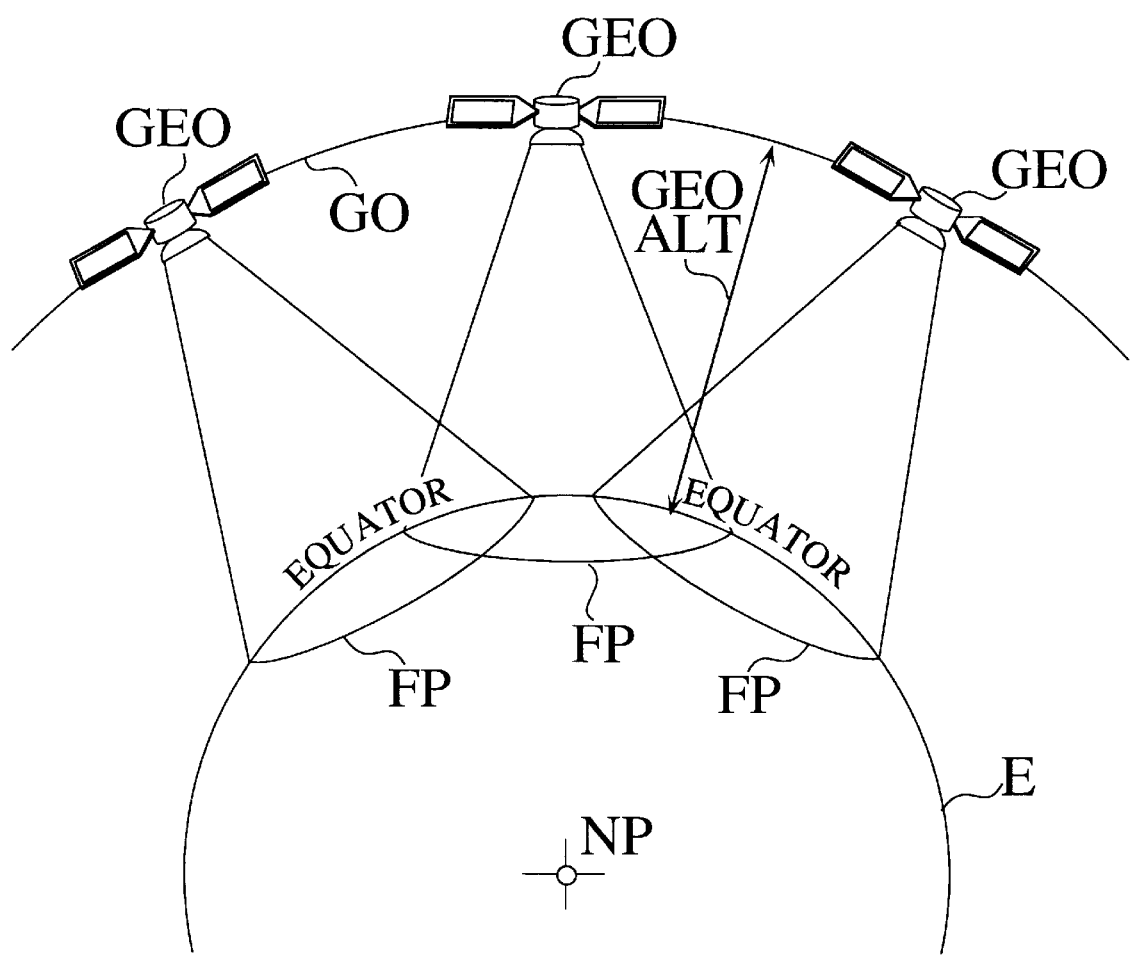
FIG. 1 is a schematic illustration of the Earth shown from the perspective of a viewer positioned above the North Pole. Three conventional satellites and their footprints are depicted flying in geostationary orbits above the Equator.

FIG. 1 is a schematic depiction of the Earth E. The view shown in FIG. 1 is taken from the perspective of an observer located above the North Pole NP. Three geostationary satellites GEO are shown circling the Earth E in a single geostationary and Equatorial orbit GO. These satellites are positioned approximately 22,300 miles above the Earth's surface. Since they orbit at the geosynchronous altitude GEO ALT, each satellite remains fixed over a particular point directly beneath it on the Equator. Each geostationary satellite GEO illuminates a region on the Earth's surface called a footprint FP. The satellites portrayed in FIG. 1 represent conventional satellites which currently broadcast television and radio signals using the C and $K_u$ frequency bands.

Figure 2:
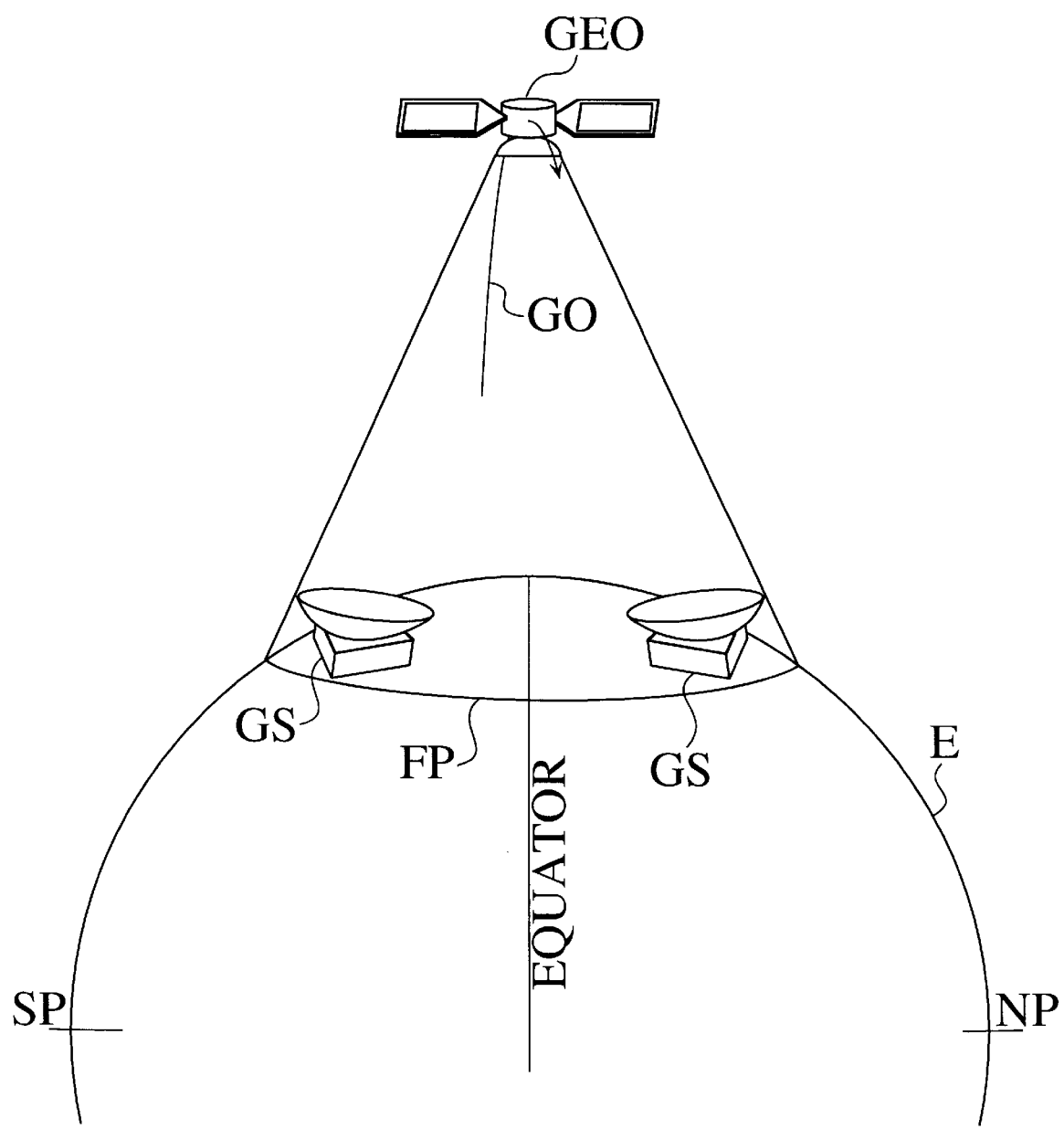
FIG. 2 is also a schematic illustration of the Earth, but the perspective in this illustration is from that of a viewer positioned over the Equator.

FIG. 2 is another schematic rendition of the Earth F, and includes a single geostationary, noninclined orbit satellite GEO circling the Earth E directly above the Equator. Two ground stations GS designed to receive signals from the geostationary satellite GEO are located within the footprint FP of the satellite GEO. To receive signals broadcast from the geostationary satellite GEO, each ground station GS must have its antenna pointed toward the plane of the Earth's Equator EQ.

The Preferred Embodiment of the Invention

Figure 3:
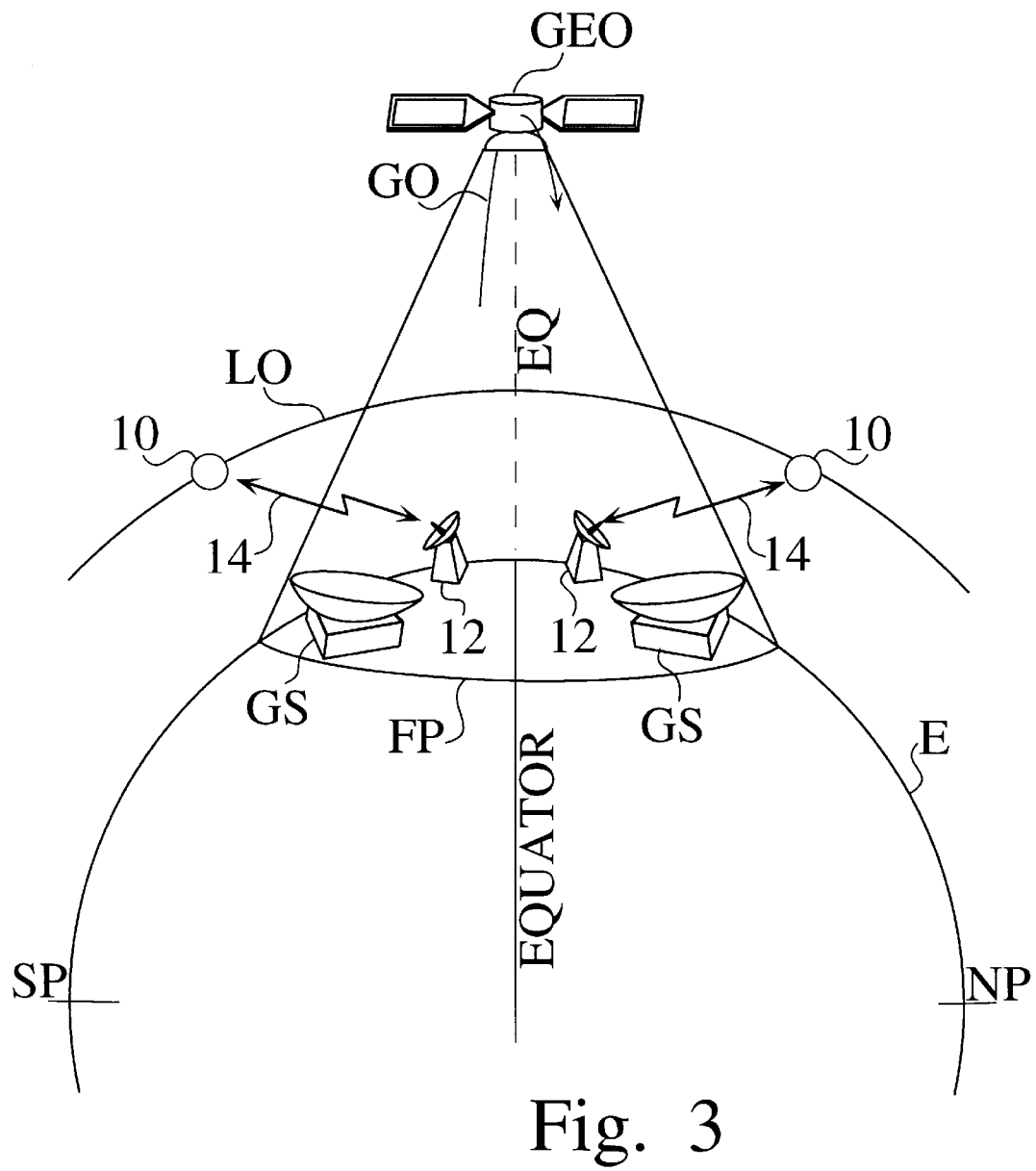
FIG. 3 portrays both conventional geostationary satellites (GEO) in relatively high orbits over the Equator, and satellites in low Earth orbits employing the present invention. Ground stations which communicate with the geostationary satellites point back toward the plane of the Equator, while terminals which communicate with the low Earth orbit (LEO) satellites are pointed away from the plane of the Equator toward either the North or South Pole of the Earth.

FIG. 3 supplies a pictorial explanation of the preferred embodiment of the present invention. The geostationary, noninclined orbit satellite GEO shown in FIG. 3 is the same as those depicted in FIGS. 1 and 2. The geostationary satellite GEO communicates with ground stations GS that must have antennas which are pointed away from the Earth's Poles and toward the plane of the Equator EQ. The geostationary satellite GEO and the ground stations GS utilize the C and $K_u$ frequency bands.

FIG. 3 also exhibits non-geostationary satellites 10 in low Earth inclined orbits LO. These satellites 10 communicate with terrestrial terminals 12 using the same C and $K_u$ bands. The geostationary and low Earth orbit systems are able to operate without interference and without coordination. This ability to share the same frequency bands is a direct result of the spatial isolation of the signals emitted by the different satellite systems. The radio beams that travel between the ground stations GS and the geostationary satellite GEO travel up from the Earth's surface toward the plane of the Equator. In sharp contrast, the radiated energy 14 utilized by the low Earth inclined orbit satellites 10 and the terrestrial terminals 12 propagate in a direction that extends away from the plane of the Equator and toward one of the Earth's Poles. By propagating signals in directions that do not coincide with the direction of signals from the geostationary communication system, inclined orbit satellite systems can share the same frequencies. The present invention requires that the radiant energy 14 generated by the inclined orbit satellites 10 and by the terrestrial terminals 12 never intersect the plane of the Equator.

Figure 4:
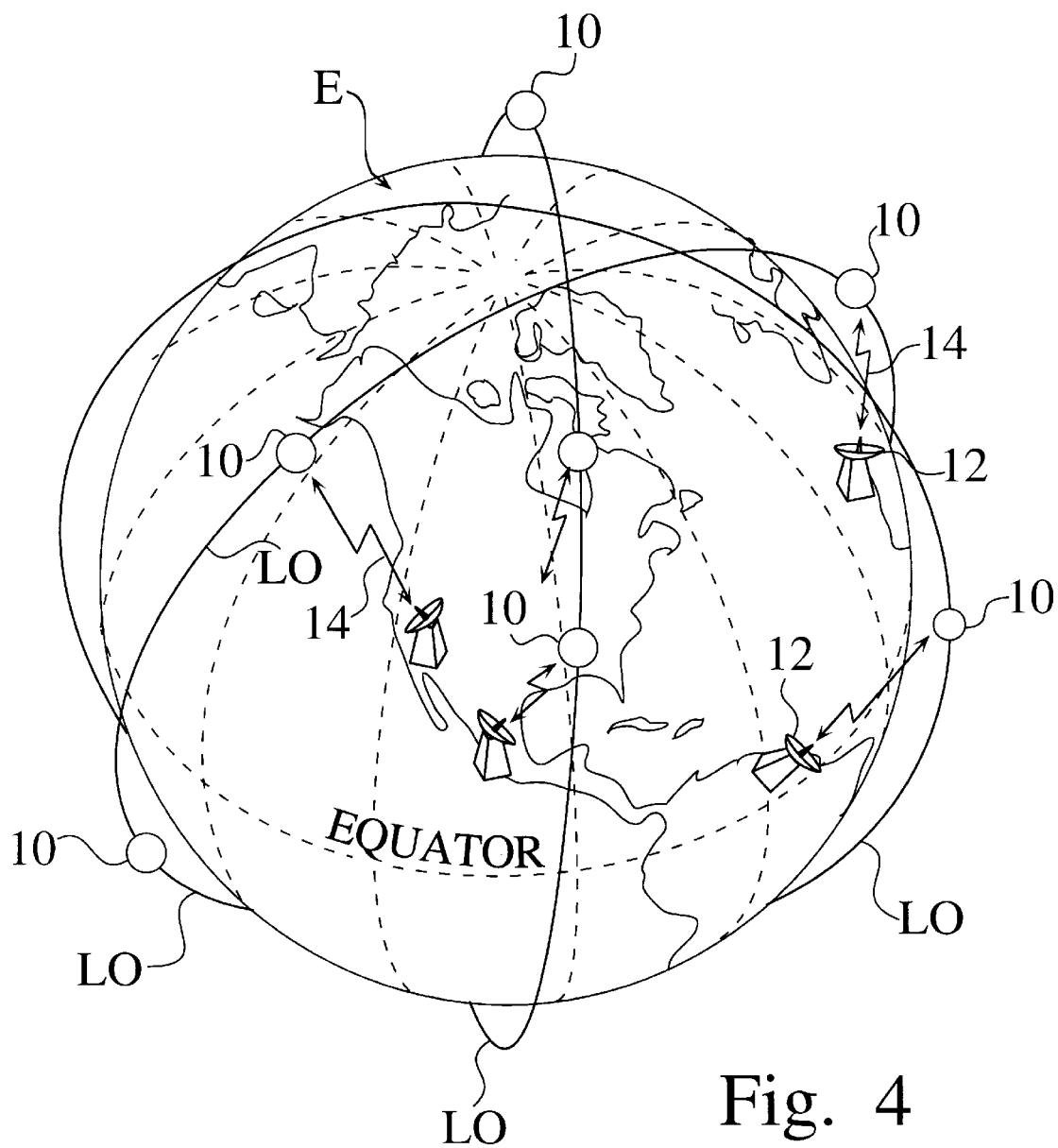
FIG. 4 is a perspective view that exhibits a constellation of low Earth orbit satellites and terrestrial terminals which utilize the present invention.
Figure 5:
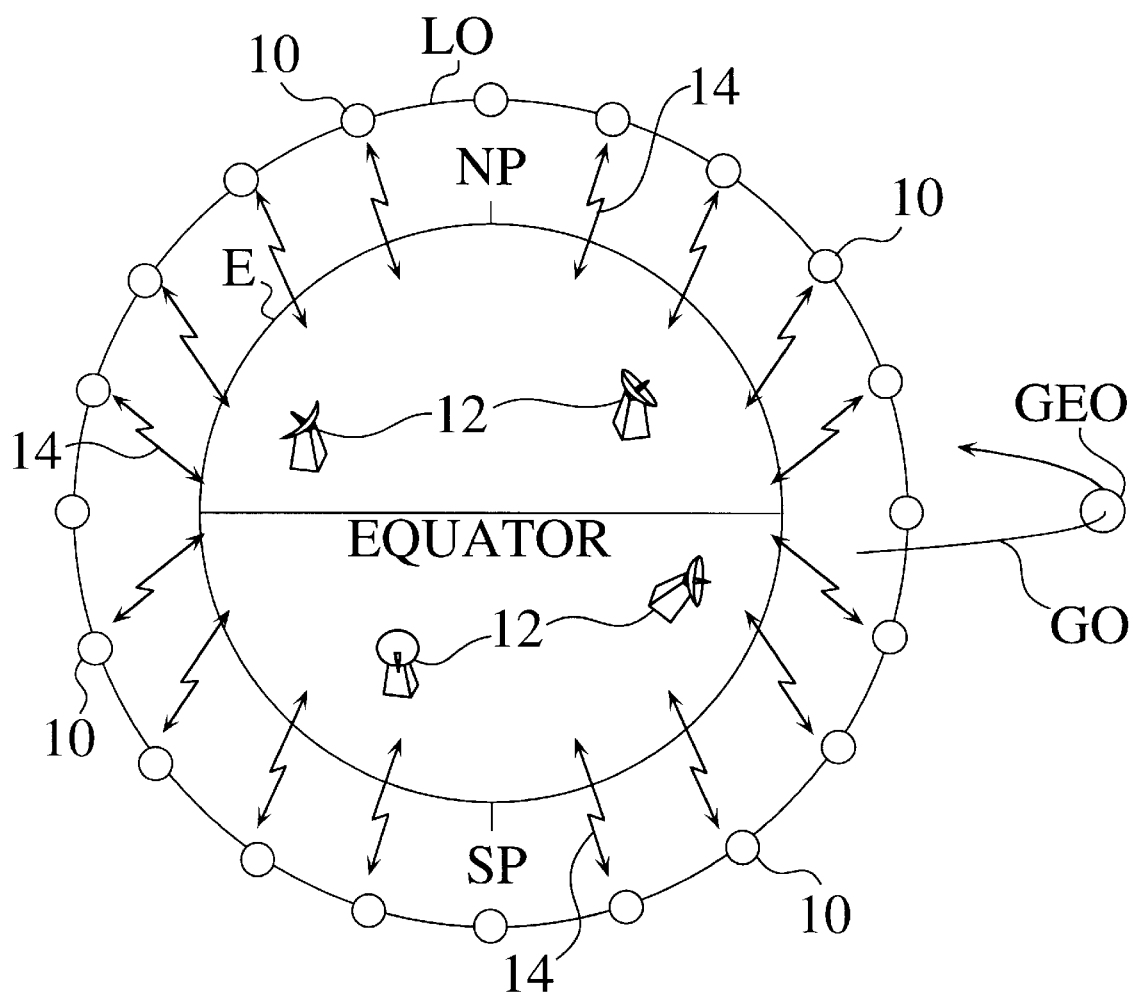
FIG. 5 is a view from above the Equator that exhibits a constellation of low Earth orbit satellites and terrestrial terminals which utilize the present invention.

FIG. 4 is a schematic illustration of satellites 10 in low Earth inclined orbits LO communicating with terrestrial terminals 12 in accordance with the method of the present invention. FIG. 5 is a schematic illustration similar to FIG. 4, but from the vantage point of an observer located in the plane of the Equator.

Figure 6:
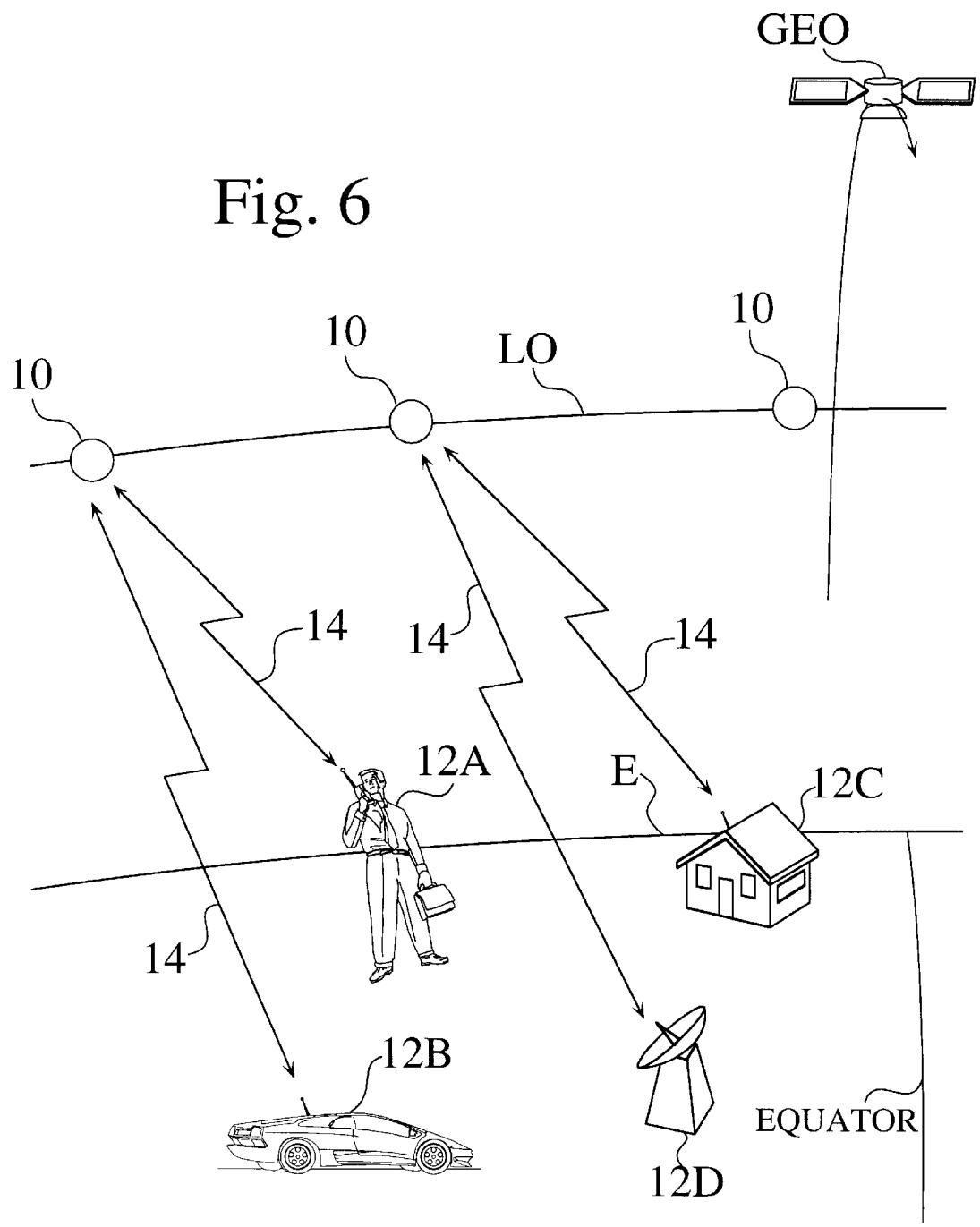
FIG. 6 illustrates LEO satellites employing the present invention to communicate with personal, mobile and fixed terminals and gateways.

FIG. 6 portrays satellites 10 in a low Earth inclined orbit communicating with portable 12A, mobile 12B and fixed 12C terminals and gateways 12D via beams of radiated energy 14. The portable terminals 12A, mobile terminals 12B and fixed terminals 12C depicted are equipped with directional beam antennas, for example, similar to those disclosed in *Terrestrial Antennas for Satellite Communication System* by Asu Ram Jha, cited above in CROSS REFERENCES section. The gateways 12D are generally equipped with high-gain directional beam antennas.

Figure 7:
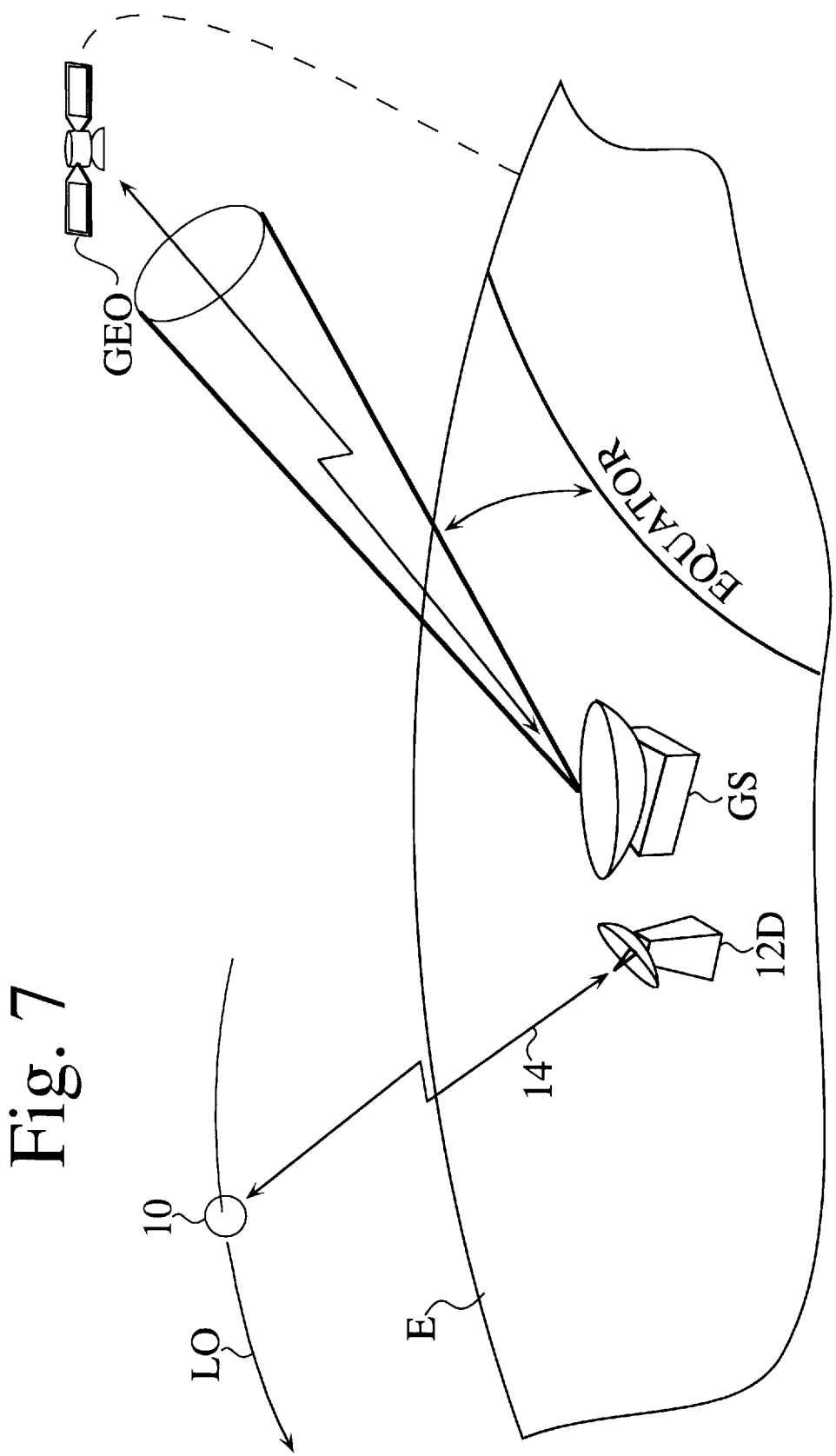
FIG. 7 compares the communication links between GEO satellites flying above the Equator and LEO satellites that transmit and receive beams which are directed away from the plane of the Equator to avoid interfering with GEO satellites.

FIG. 7 compares the radio beams which travel between conventional geostationary satellites GEO and their ground stations GS, and the radiated energy 14 which propagates between inclined orbit satellites 10 and terrestrial terminals 12.

Although for purposes of illustration, only low Earth orbits LO have been depicted in the FIGS. 3 through 7, it should be clear to the reader that other types of orbits used by communication satellites are also useful in the present invention. These range from generally circular, low Earth orbits LO to inclined geosynchronous orbits which operate at about 22,300 miles (35,900 kilometers) above the Earth's surface, to highly eccentric orbits such as the "Molniya" orbit, named after a class of Russian communication satellites. Low Earth orbits LO generally describe orbits which have altitudes much lower than geosynchronous orbits. They are particularly useful because of the lower power requirements for the terrestrial terminals. Polar or highly inclined low Earth orbits LO are particularly useful because they offer the potential of global coverage with the fewest satellites 10. Molniya-type orbits may have an apogee which is much higher than the altitude of a geosynchronous orbit. Such orbits may be placed entirely beyond the Van Allen radiation belt to prolong the life of electronics aboard. The longer dwell time and high mask angle of satellites in such elliptical orbits is particularly useful for mobile terminals in the northern hemisphere.

Figure 8:
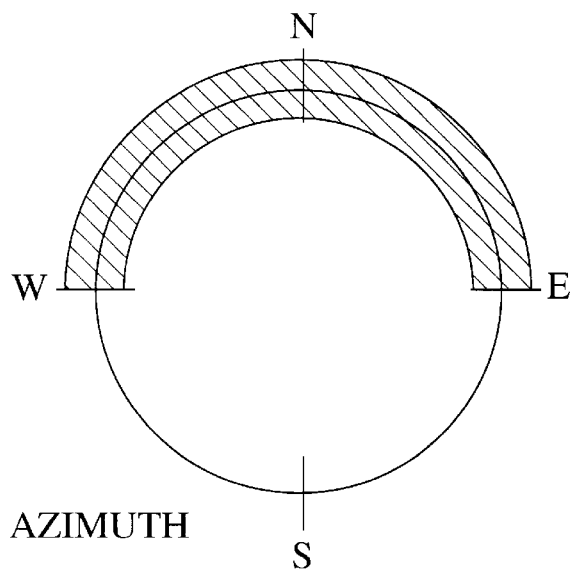
FIGS. 8 and 9 present schematic illustrations of the operating ranges of terminal pointing for the present invention for terminals located in the northern hemisphere.
Figure 9:
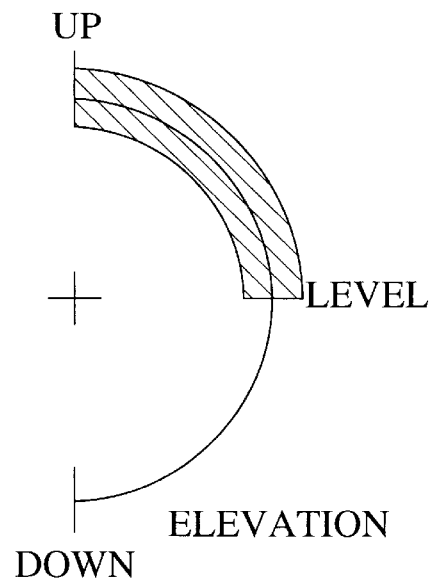

FIGS. 8 and 9 present schematic illustrations of the operating ranges of the present invention for terminals located in the northern hemisphere. For a subscriber using a terminal in the northern hemisphere, FIG. 8 indicates that his or her terminal will communicate with any satellite that is north of the compass points East and West. FIG. 9 shows that the same terminal will be able to transmit and receive signals for any angle of elevation between the horizon and the zenith.

Figure 10:
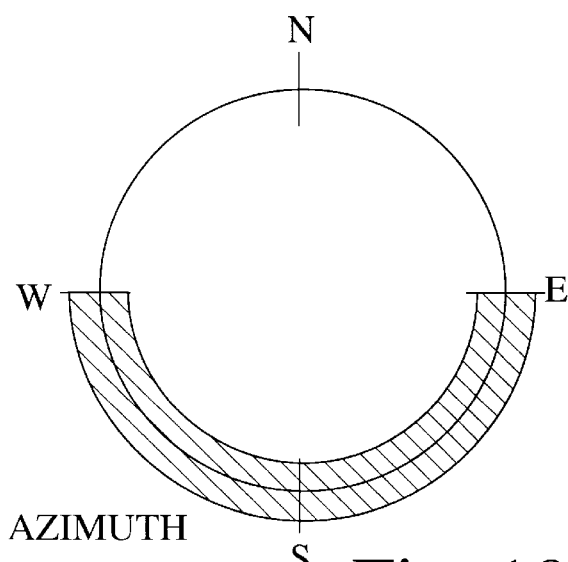
FIGS. 10 and 11 present schematic illustrations of the operating ranges of terminal pointing for the present invention for terminals located in the southern hemisphere.
Figure 11:
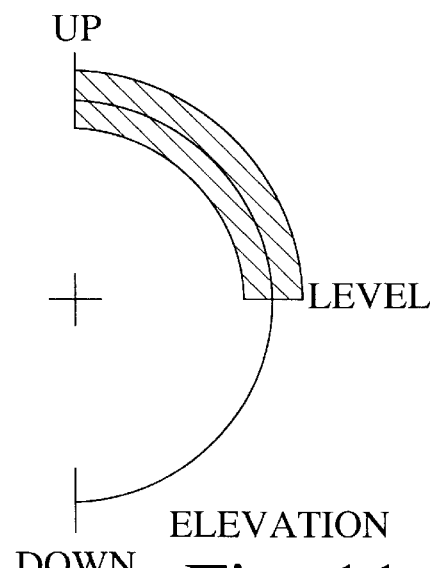
Figure 12:
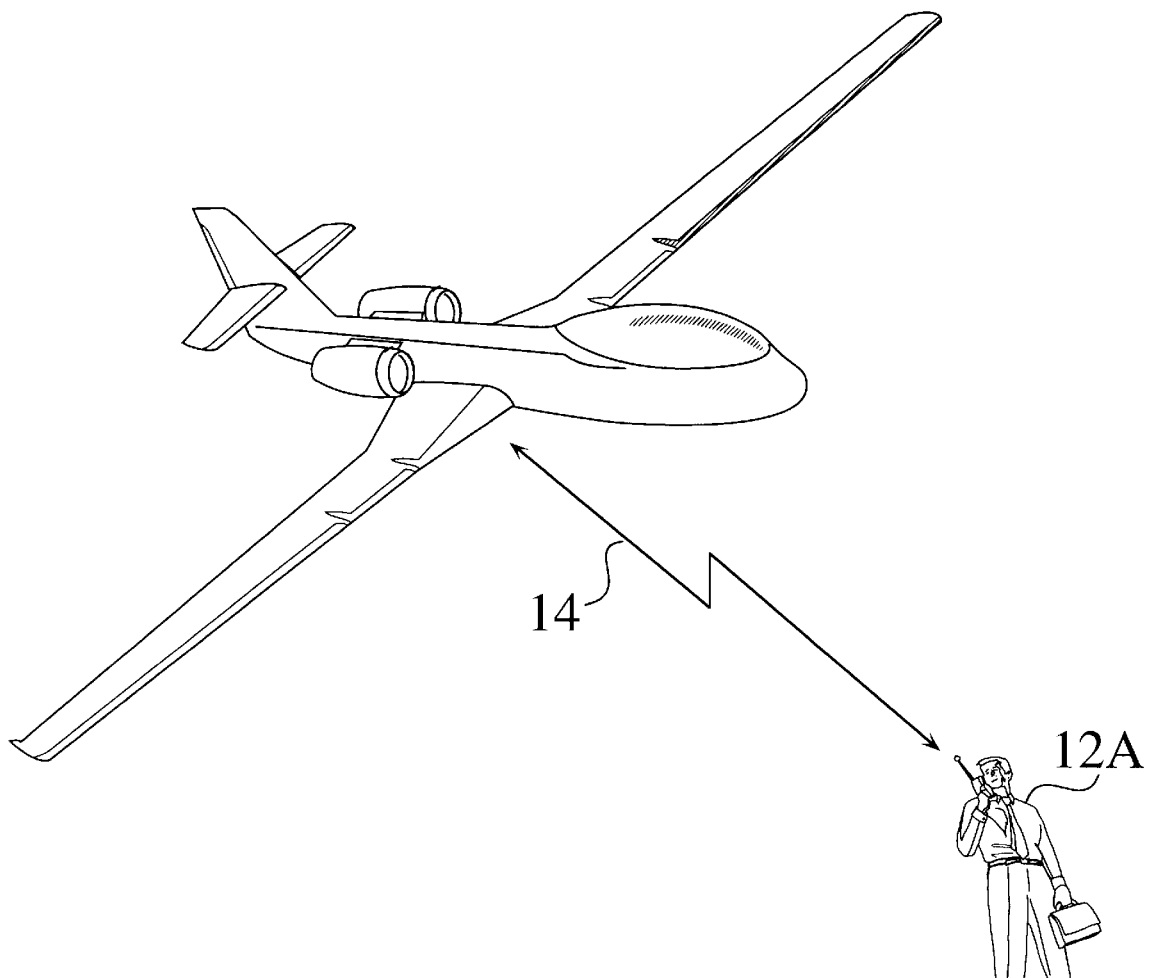
FIGS. 12, 13, 14 and 15 supply diagrams of intra-atmospheric vehicles that may be utilized to practice an alternative embodiment of the invention.
Figure 13:
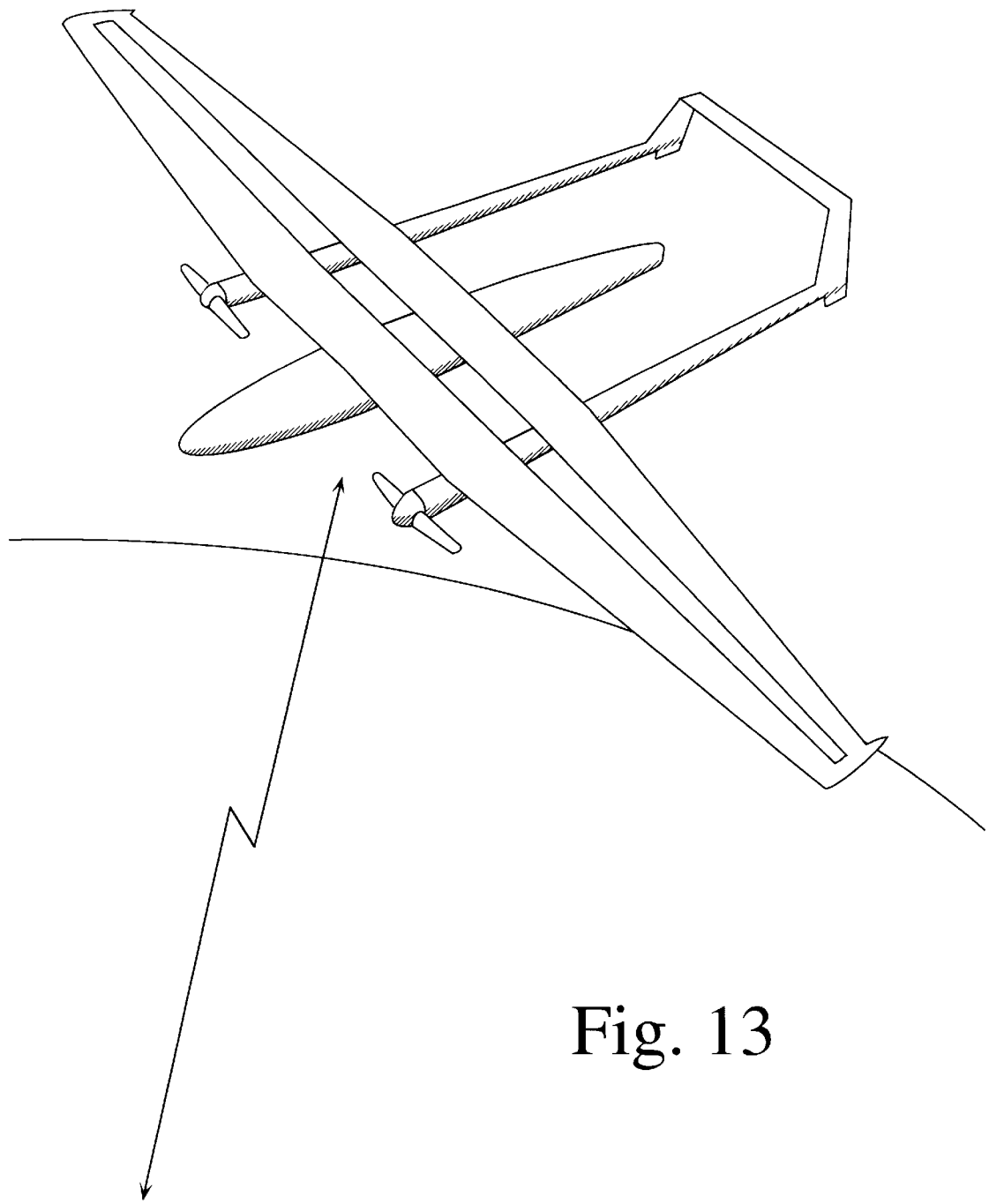
Figure 14:
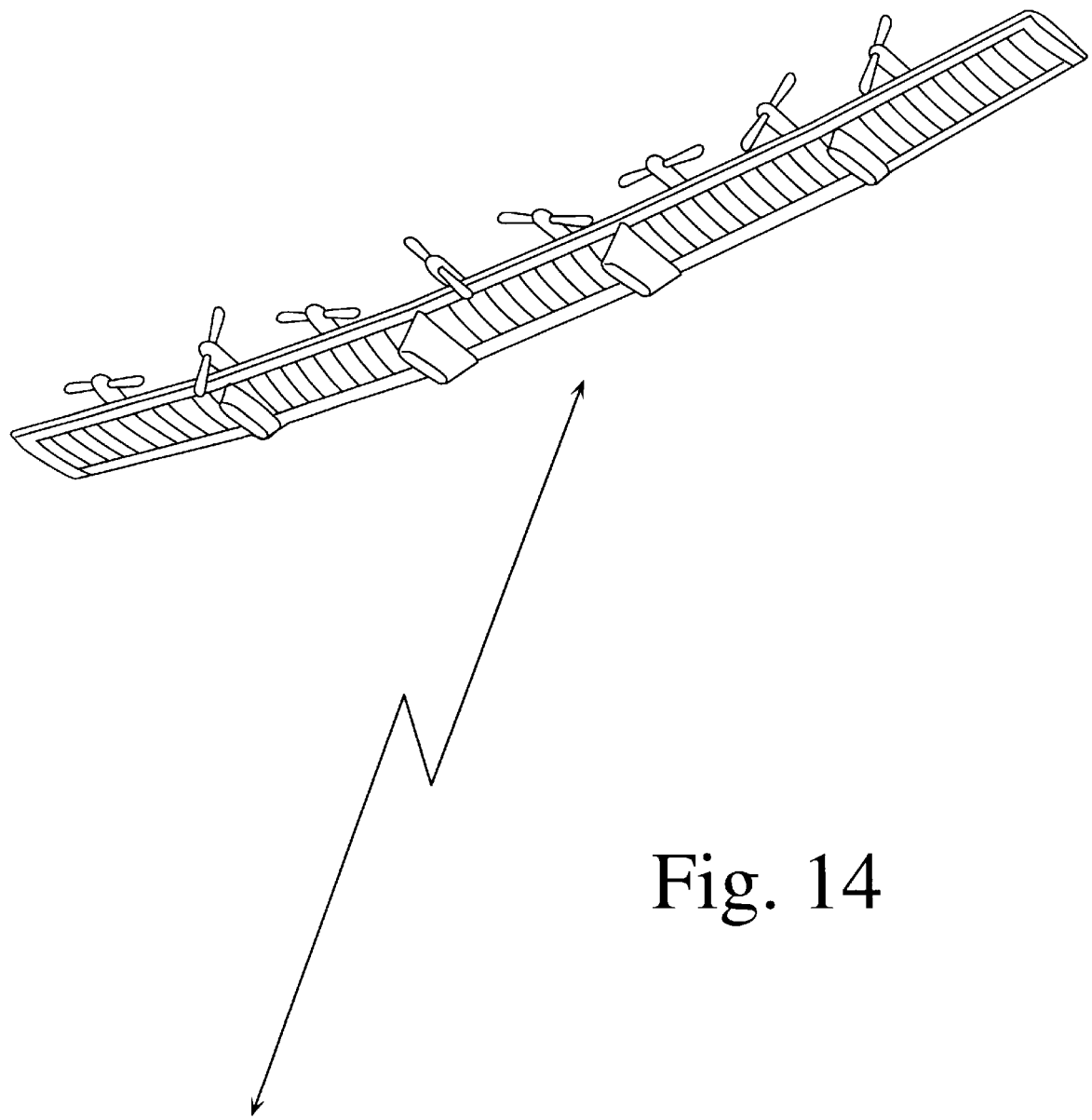
Figure 15:
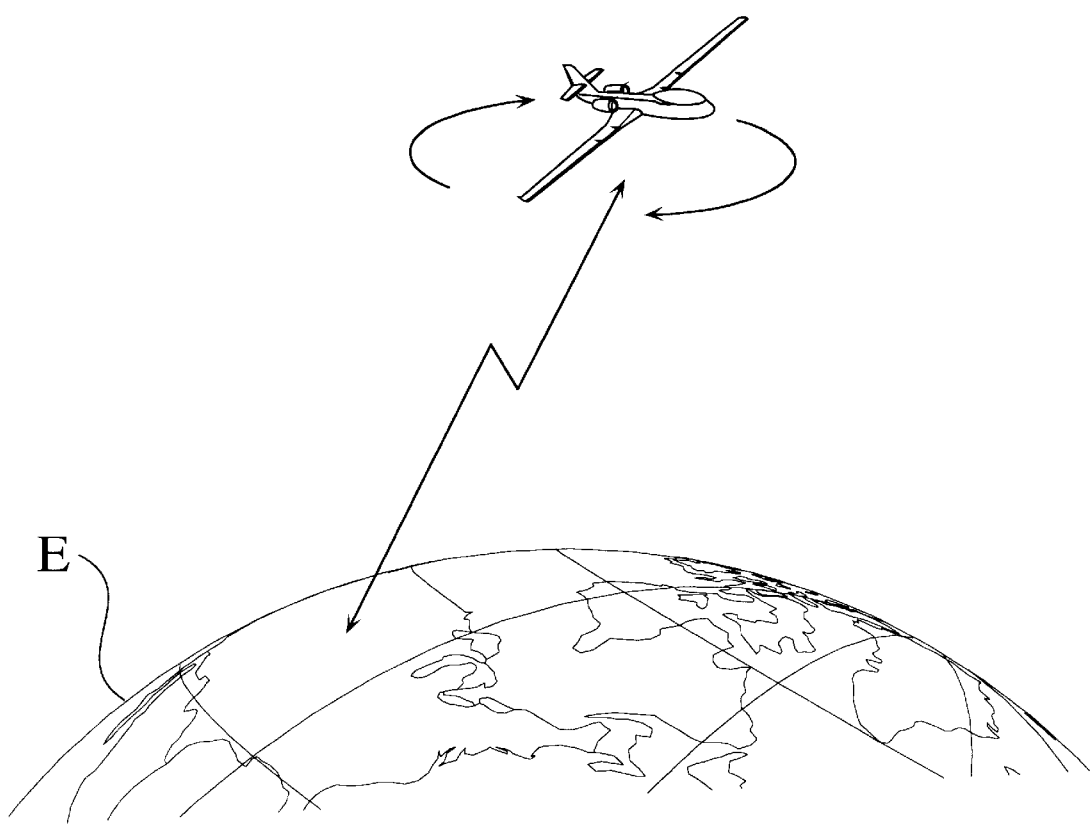

FIGS. 10 and 11 present similar schematic illustrations of the operating ranges of the present invention for terminals located in the southern hemisphere. A subscriber in the southern hemisphere will be able to use his or her terminal for any angle of azimuth that points toward the southern half of the compass and for any angle of elevation above the horizon.

FIGS. 12, 13, 14 and 15 present illustrations of aircraft that may be utilized to implement the present invention in the place of satellites in low Earth orbit.

FIG. 16 is an illustration of a satellite communication system that uses cells 26 in an Earth-fixed grid 20. The schematic diagram shows a single satellite 10 flying over a single Earth-fixed target cell 26 in three sequential positions, and steering a beam 30 of one frequency to continuously illuminate the cell 26 during the times T1, T2 and T3. As the satellite 10 progresses in its orbit LO, the beams of radiant energy 14 which are generated by a scanning beam antenna system are precisely steered so they illuminate the Earth-fixed cells 26.

FIG. 17 is an illustration of a satellite communication system that uses satellite-fixed cells 35 and a low mask angle of 8.5 degrees. Satellites 10 which fly in low Earth orbit move over large regions of the Earth's surface E very rapidly. The beams 14 generated by these satellites 10 sweep across the Earth's surface E at the same rapid rate of speed. In a system that employs satellite-fixed cells, the footprint of the beams 14 propagated by the spacecraft 10 defines the area on the ground called a cell 35. The satellite-fixed cell 35 moves constantly with the satellite 31 as it orbits the globe E.

An Earth-fixed cell 26 contrasts sharply with the satellite-fixed cell 35. It is a stationary region mapped to an Earth-fixed grid 20 that has permanent boundaries on the Earth E as does a city or a state. Although the satellite beams 14 move over the ground rapidly, the location of the beam footprints at any time do not determine the location of the unchanging Earth-fixed cells 26. The great advantage of using Earth-fixed cells is realized when a terrestrial terminal 12 being served by one satellite 10 must switch to another beam 14 in the satellite 10 or to another satellite 10 because the first is moving out of range below the local horizon. A system with satellite-fixed cells 35 requires the assignment of a new communication channel within the next beam 14 or next satellite 10. The assignment process takes time, consumes processing capacity at the terminal station and the satellite. It is subject to blocking, call interruption and call dropping if there is not an unused communication channel in the new beam or satellite.

One alternative embodiment of the present invention takes advantage of the Earth-fixed cell method and illuminates the cell 26 that is within the beam footprint. The beams 14 are continually adjusted to compensate for the effects of satellite motion, attitude changes, rotation of the Earth E and non-alignment of the satellite track with the Earth-fixed grid 20. The reader is invited to read a more complete description of Earth-Fixed Cell Beam Management in U.S. Pat. No. 5,408,237, referred to above.

In this embodiment, non-interfering communication is control the satellites 10 to communicate with terrestrial terminal 12 in an Earth-fixed Cell 26 only when the Earth-fixed Cell 26 and a sub-satellite point of said satellite 10 are in the same hemisphere. The sub-satellite point is at a latitude more northerly than all points within a footprint of said Earth-fixed Cell 26 in the northern hemisphere or more southerly in the southern hemisphere than all points within the footprint.

When used in this Specification or in the Claims that follow, the term "radiated energy" pertains to any form of energy, including a signal, which is transported from one position to another. Radiated energy includes all forms of waves and particles irrespective of wavelength, including electromagnetic and optical radiation. The term "communication" not only refers to the conveyance of signals or messages in two directions between a satellite and a terminal, but also embraces a one-way flow of information such as a satellite broadcast or remote sensing applications. The term "terrestrial terminal" incorporates any receiver, transmitter or transceiver on or near the Earth's surface. The word "terminal" is intended to encompass any device capable of sending or receiving radiated energy. A terrestrial terminal is generally a personal, mobile or fixed terminal or gateway, and may be located on the ground, on the ocean or aloft in an aircraft.

CONCLUSION

Although the present invention has been described in detail with reference to particular preferred and alternative embodiments, persons possessing ordinary skill in the art to which this invention pertains will appreciate that various modifications and enhancements may be made without departing from the spirit and scope of the claims that follow. The various orbital parameters that have been disclosed above are intended to educate the reader about particular embodiments, and are not intended to constrain the limits of the invention or the scope of the claims. When used in the Specification and claims, the term "inclined" encompasses any orbit that does not lie in the plane of the Earth's Equator. The only satellites that may not take advantage of the present invention are those which operate in orbits having zero inclination. The present invention may be utilized with a wide variety of particular satellite designs. The List of Reference Characters which follows is intended to provide the reader with a convenient means of identifying elements of the invention in the Specification and Drawings. This list is not intended to delineate or narrow the scope of the claims.

LIST OF REFERENCE CHARACTERS

E Earth
EQ Plane of the Equator
FP Footprint of satellite in geostationary orbit
GEO Satellite in Equatorial orbit
GEO
ALT Geosynchronous altitude
GO Geostationary Orbit
GS Ground station that communicates with a satellite in geostationary orbit
LO Low Earth Orbit
NP North Pole
SP South Pole
T1–T3 Incremental time periods
10 Satellite in an orbit inclined to the Equator
12 Terrestrial terminal
14 Radiant energy
15 Mask angle at edge of footprint, Earth-fixed cells
20 Earth-fixed grid
26 Target cell
34 Satellite-fixed cell
35 Satellite-fixed cell footprint
36 Low mask angle

What is claimed is:

1. A communication system for sharing, without interfering with a second communication system, a common communication frequency, said second communication system having a plurality of satellites (GEO) operating in Equatorial orbital planes (GO) and ground stations (GS) which communicate with said plurality of satellites (GEO) in said Equatorial orbit planes (GO) on said common communication frequency; said communication system comprising:

a satellite (10) operating in an inclined orbit;

a terrestrial terminal (12); said terrestrial terminal (12) having an antenna which transmits and receives a beam of radiant energy (14) for communicating with said satellite (10); said beam of radiant energy (14) having a frequency common with said second communication system; and said terrestrial terminal (12) communicating with said satellite (10) only when said beam of radiant energy (14) does not intersect said Equatorial orbital planes (GO).

2. The system as claimed in claim 1 in which said satellite (10) operates in an inclined orbit at an altitude less than that of an inclined geosynchronous orbit.

3. The system as claimed in claim 1 in which said satellite (10) operates in an inclined geosynchronous orbit.

4. The system as claimed in claim 1 in which said satellite (10) operates in an inclined eccentric orbit, said inclined eccentric orbit having an apogee greater than that of an inclined geosynchronous orbit.

5. A communication system for sharing, without interfering with a second communication system, a common communication frequency, said second communication system having a plurality of satellites (GEO) operating in Equatorial orbital planes (GO) and ground stations (GS) which communicate with said plurality of satellites (GEO) in said Equatorial orbit planes (GO) on said common communication frequency; said communication system comprising:

a constellation of satellites (10) operating in a plurality of inclined orbits; each one of said satellites (10) having a sub-satellite point on Earth (E);

a plurality of terrestrial terminals (12) located at latitudes in Earth's northern and southern hemisphere substantially above and below the Equator; each one of said plurality of terrestrial terminals (12) having an antenna for communicating with one of said plurality of satellites (10); said communication carried out on a frequency common with said second communication system;

each of said terrestrial terminals (12) in said northern hemisphere communicating with one of said satellites (10) only when said sub-satellite point of said satellite (10) is also in said northern hemisphere at a latitude more northerly than that of said terrestrial terminal (12); and each of said terrestrial terminals (12) in said southern hemisphere communicating with one of said satellites (10) only when said sub-satellite point of said satellite (10) is also in said southern hemisphere at a latitude more southerly than that of said terrestrial terminal (12).

6. The system as claimed in claim 5 in which said constellation of satellites (10) operate in a plurality of inclined orbits, each of which said plurality of inclined orbits has an altitude less than that of an inclined geosynchronous orbit.

7. The system as claimed in claim 5 in which said constellation of satellites (10) operate in a plurality of inclined geosynchronous orbits.

8. The system as claimed in claim 5 in which said constellation of satellites (10) operate in a plurality of inclined eccentric orbits, each of which said plurality of inclined eccentric orbits has an apogee greater than that of an inclined geosynchronous orbit.

9. The system as claimed in claim 5 in which said constellation of satellites (10) operate in a plurality of inclined orbits, at least one of which orbits has an altitude less than that of an inclined geosynchronous orbit, at least one of which orbits has an apogee greater than that of an inclined geosynchronous orbit and at least one of which orbits is an inclined geosynchronous orbit.

10. Communication apparatus for sharing, without interfering with a second communication apparatus, a common communication frequency, said second communication apparatus having a plurality of satellites (GEO) operating in Equatorial orbital planes (GO) and ground stations (GS) which communicate with said plurality of satellites (GEO) in said Equatorial orbit planes (GO) on said common communication frequency; said communication apparatus comprising:

a constellation of satellites (10) operating in a plurality of inclined orbits;

a plurality of terrestrial terminals (12) located at latitudes in Earth's northern and southern hemisphere substantially above and below the Equator; each one of said plurality of terrestrial terminals (12) having an antenna for communicating with one of said plurality of satellites (10); said communication carried out on a frequency common with said second communication system;

each of said terrestrial terminals (12) in said northern hemisphere communicating with one of said satellites (10) only when a sub-satellite point of said satellite (10) is also in said northern hemisphere at a latitude more northerly than that of said terrestrial terminal (12);

each of said terrestrial terminals (12) in said southern hemisphere communicating with one of said satellites (10) only when a sub-satellite point of said satellite (10) is also in said southern hemisphere at a latitude more southerly than that of said terrestrial terminal (12);

said plurality of inclined orbits including at least one orbit which has an altitude less than that of an inclined geosynchronous orbit, at least one orbit which has an apogee greater than that of an inclined geosynchronous orbit and at least one orbit which is an inclined geosynchronous orbit.

11. A method for sharing a common communication frequency by a communication system, without interference with a second communication system, said second communication system having a plurality of satellites (GEO) operating in Equatorial orbital planes (GO) and ground stations (GS) which communicate with said plurality of satellites (GEO) in said Equatorial planes (GO) on said common communication frequency; said method comprising the steps of:

operating a satellite (10) in an inclined orbit;

communicating with said satellite (10) by transmitting and receiving a beam of radiant energy (14) from a terrestrial terminal (12); said beam of radiant energy (14) having a frequency common with said second communication system; and communicating with said satellite (10) from said terrestrial terminal (12) only when said beam of radiant energy (14) does not intersect said Equatorial orbital planes (GEO).

12. The method as claimed in claim 11 in which said step of operating a satellite (10) in an inclined orbit includes the step of operating a satellite (10) in an orbit which has an altitude less than that of a geosynchronous orbit.

13. The method as claimed in claim 11 in which said step of operating a satellite (10) in an inclined orbit includes the step of operating a satellite (10) in an inclined geosynchronous orbit.

14. The system as claimed in claim 11 in which said step of operating a satellite (10) in an inclined orbit includes the step of operating a satellite (10) in an inclined eccentric orbit, said inclined eccentric orbit having an apogee greater than that of an inclined geosynchronous orbit.

15. A method for sharing a common communication frequency by a communication system, without interference with a second communication system, said second communication system having a plurality of satellites (GEO) operating in Equatorial orbital planes (GO) and ground stations (GS) which communicate with said plurality of satellites (GEO) in said Equatorial planes (GO) on said common communication frequency; said method comprising the steps of:

operating a constellation of satellites (10) in a plurality of inclined orbits; each one of said satellites (10) having a sub-satellite point on Earth (E);

locating a plurality of terrestrial terminals (12) at latitudes in Earth's northern and southern hemisphere substantially above and below the Equator; each one of said plurality of terrestrial terminals (12) having an antenna for communicating with at least one of said satellites (10); said communicating carried out on a frequency common with said second communication system;

communicating with at least one of said satellites (10) from one of said plurality of terrestrial terminals (12) in said northern hemisphere only when said sub-satellite point of said satellite (10) is also in said northern hemisphere at a latitude more northerly than that of said terrestrial terminal (12); and communicating with one of said satellites (10) from one of said plurality of terrestrial terminals (12) in said southern hemisphere only when said sub-satellite point of said satellite (10) is also in said southern hemisphere at a latitude more southerly than that of said terrestrial terminal (12).

16. The method as claimed in claim 15, in which said step of operating a constellation of satellites (10) in a plurality of inclined orbits includes the step of operating a constellation of satellites (10) in a plurality of inclined orbits, at least one of said orbits having an altitude less than that of an inclined geosynchronous orbit.

17. The method as claimed in claim 15 in which said step of operating a constellation of satellites (10) in a plurality of inclined orbits includes the step of operating a constellation of satellites (10) in a plurality of inclined orbits, at least one of said orbits being a geosynchronous orbit.

18. The method as claimed in claim 15 in which said step of operating a constellation of satellites (10) in a plurality of inclined orbits includes the step of operating a constellation of satellites (10) in a plurality of inclined eccentric orbits at least one of said orbits having an apogee greater than that of an inclined geosynchronous orbit.

19. The method as claimed in claim 15 in which said step of operating a constellation of satellites (10) in a plurality of inclined orbits includes the step of operating a constellation of satellites (10) in a plurality of inclined orbits, at least one of which said orbits has an altitude less than that of a geosynchronous inclined orbit, at least one of which said orbits has an apogee greater than that of an inclined geosynchronous orbit and at least one of which said orbits is an inclined geosynchronous orbit.

20. A method for sharing a common communication frequency by a communication system, without interfering with a second communication system, said second communication system having a plurality of satellites (GEO) operating in Equatorial orbital planes (GO) and ground stations (GS) which communicate with said plurality of satellites (GEO) in said Equatorial planes (GO) on said common communication frequency; said method comprising the steps of:

operating a constellation of satellites (10) in a plurality of inclined orbits;

said satellites (10) employing a plurality of Earth-fixed cells (26) in an Earth-fixed grid (20);

each one of said satellites (10) having a sub-satellite point on Earth (E);

locating a plurality of terrestrial terminals (12) at latitudes in Earth's northern and southern hemisphere substantially above and below the Equator; each one of said plurality of terrestrial terminals (12) having an antenna for communicating with at least one of said plurality of satellites (10); said communicating carried out on a frequency common with said second communication system;

assigning said satellites (10) to communicate with at least one of said terrestrial terminals (12) in an Earth-fixed Cell (26) only when said Earth-fixed cell (26) and said sub-satellite point of said satellite (10) are in said northern hemisphere, and all points within a footprint of said Earth-fixed cell (26) are at a latitude more southerly than that of said sub-satellite point;

assigning said satellites (10) to communicate with at least one of said terrestrial terminals (12) in an Earth-fixed cell (26) only when said Earth-fixed cell (26) and said sub-satellite point of said satellite (10) are in said southern hemisphere, and all point a footprint of said Earth-fixed cell (26) are at a latitude more northerly than that of said sub-satellite point.

\* \* \* \* \*